(No Model.)

C. B. BOSWORTH.
HOSE COUPLING.

No. 418,906. Patented Jan. 7, 1890.

Witnesses.
A. F. Piper
W. E. Piper

Inventor.
Charles B. Bosworth
by S. N. Piper, att'y

UNITED STATES PATENT OFFICE.

CHARLES B. BOSWORTH, OF EVERETT, ASSIGNOR TO THE CROSBY STEAM GAGE AND VALVE COMPANY, OF BOSTON, MASSACHUSETTS.

HOSE-COUPLING.

SPECIFICATION forming part of Letters Patent No. 418,906, dated January 7, 1890.

Application filed October 10, 1889. Serial No. 326,602. (No model.)

*To all whom it may concern:*

Be it known that I, CHARLES B. BOSWORTH, a citizen of the United States, residing at Everett, in the county of Middlesex and State of Massachusetts, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
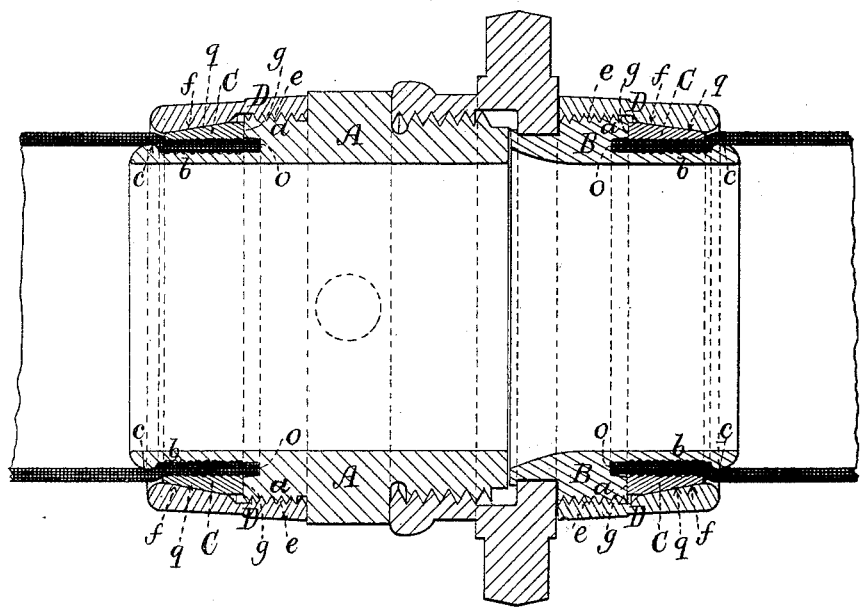
Figures 2, 3, 4, 5, 6:
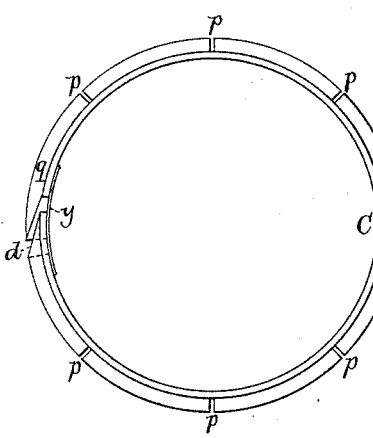

Figure 1 is a longitudinal and median section of a hose-coupling provided with my invention, portions of the hose being shown as secured thereto. Fig. 2 is an edge elevation; Fig. 3, a side view, and Figs. 4 and 5 transverse sections of the tapering split ring. Fig. 6 is a transverse section of one of the sleeves as formed to compress the said split ring against the hose and securely clamp it to the shank of the coupling.

My improvement consists in the employment, in a hose-coupling formed at each end of it with a projecting annular shank, each shank being provided with a projecting annular lip or flange near its outer end, of a ring to encompass each shank, said rings being split obliquely, and having a smooth tapering outer circumference grooved axially, and a cylindrical interior periphery grooved in and around it, as shown, each ring being compressed against the hose arranged between it and its shank by a sleeve having a smooth tapering interior periphery corresponding to and working against the tapering circumference of said ring when said sleeve is revolved; and, furthermore, there is secured to the interior surface of each ring a thin metallic plate to lap across and cover the inclined split therein to prevent the hose while under pressure from entering between the ends of said split ring; and, furthermore, by forming the said ring as shown it is no hinderance to the ready withdrawal of the hose, and it from the shank, after removal of the sleeve from the coupling.

In carrying out my invention I provide the body portions A and B of the coupling, which are connected to each other so as to swivel, with male screws $a\ a$, as shown, the shank $b$ of each of said portions having at its outer end and extending beyond its exterior cylindrical and grooved surface an annular enlargement or projection $c$. Said portions A and B also each have an annular groove $o$ to receive the end portion of the hose, as shown in Fig. 1.

C represents a tapering ring having a smooth outer surface $q$, grooved axially at $p$ and split obliquely, as shown at $d$ in Figs. 2 and 3, its interior cylindrical surface having peripheral grooves in it, as shown at $r$, a thin metallic plate $y$ being fixed at one end of it to said surface and arranged to cover the oblique split $d$. (See Figs. 2 and 5.)

The sleeve D (see Figs. 1 and 6) is provided with a female screw $e$, to receive and connect with the male screw $a$ of the body portions A or B, and it also has a smooth tapering bearing $f$, corresponding with and to work against the tapering outer surface $q$ of the ring C, to compress said ring around the hose during the revolution and advance of said sleeve on the screw $a$.

To connect a hose to the coupling, first apply the sleeve D to the hose and push said sleeve back from the end of it a short distance, its screw end being toward the end of the hose to be applied to the coupling. Next apply the ring C to said end of the hose, its thin edge being toward the said sleeve. Next insert the shank $b$ within the hose until the end of the hose brings up against the bottom of the groove $o$ in the body of the coupling. Next move the ring C along on the hose and bring its thick edge to a bearing against the shoulder $g$. Then move the sleeve D along on the hose and over the said ring C, connect the screws $a$ and $e$, and revolve the sleeve, which will draw the tapering bearing $f$ of the sleeve against the tapering outer surface $q$ of the ring C and contract the latter around and against the hose and said hose against the shank $b$ and the projection $c$ of the coupling.

It is arranged that the edges of the opening $d$ in the ring C shall nearly touch when the sleeve D has advanced as far as it can go on the coupling, and it will be observed that, owing to the obliquity of the said opening $d$, the end of the said ring that moves against the plate $y$ during the compression of the ring cannot double up the said plate $y$ within the opening, as it would be liable to do if the opening were axial instead of oblique; furthermore, the interior of the said ring and the exterior of the shank $b$ being grooved, as shown, the holding-power of said surfaces is increased to such extent that the outer edge of the ring and the inner edge of the projection $c$ of the shank $b$ can be rounded, as shown, and consequently are not liable to cut the hose.

By providing the body portions of the coupling with the grooves $o$ for the ends of the hose to enter, any projecting portions or fibers of the said ends are prevented from getting between the shoulder $g$ and the ring to interfere with the proper bearing of said ring against the said shoulder.

To separate the hose and coupling, unscrew the sleeve D until disconnected from its body portion, when the hose, with the ring C, can be easily withdrawn from the shank $b$ of the coupling.

What I claim is—

In a hose-coupling, the combination of the ring C, having the oblique split $d$ and tapering exterior $q$, provided with the grooves $p$, the interior of said ring being peripherally grooved and having fixed to it one end of a plate $y$, covering the oblique split, with the body of the coupling provided with the annular groove $o$, and the shank $b$, having circumferential grooves in its exterior and the annular enlargement $c$, the sleeve D, provided with the smooth tapering bearing $f$, and the screw $e$, to connect it to the body of the coupling, all as shown and set forth, and for the purpose described.

In testimony whereof I affix my signature in presence of two witnesses.

CHARLES B. BOSWORTH.

Witnesses:
S. N. PIPER,
E. H. BRIGHT.